United States Patent
Wu et al.

(10) Patent No.: US 12,480,919 B2
(45) Date of Patent: Nov. 25, 2025

(54) SYSTEM AND METHOD FOR ANALYZING LIGHT N-ALKANE COMPONENTS AND CARBON ISOTOPES IN DEEP AND ULTRA-DEEP SOURCE ROCK

(71) Applicant: Northwest Institute of Eco-Environment and Resources, CAS, Lanzhou (CN)

(72) Inventors: Yingqin Wu, Lanzhou (CN); Tong Wang, Beijing (CN); Zhiyu Wang, Lanzhou (CN); Rong Ma, Lanzhou (CN); Yan Liu, Lanzhou (CN); Zuodong Wang, Lanzhou (CN)

(73) Assignees: Northwest Institute of Eco-Environment and Resources, CAS, Lanzhou (CN); Beijing Jiaotong University, Beijing (CN)

( * ) Notice: Subject to any disclaimer, the term of this patent is extended or adjusted under 35 U.S.C. 154(b) by 192 days.

(21) Appl. No.: 18/052,849

(22) Filed: Nov. 4, 2022

(65) Prior Publication Data
US 2023/0152285 A1    May 18, 2023

(30) Foreign Application Priority Data
Nov. 12, 2021   (CN) .......................... 202111342945.8

(51) Int. Cl.
*G01N 30/12*    (2006.01)
*G01N 30/68*    (2006.01)
(Continued)

(52) U.S. Cl.
CPC ......... *G01N 30/7206* (2013.01); *G01N 30/68* (2013.01); *G01N 30/80* (2013.01);
(Continued)

(58) Field of Classification Search
CPC .............................................. G01N 2030/8405
See application file for complete search history.

(56) References Cited

U.S. PATENT DOCUMENTS 5,314,827 A * 5/1994 Schmidt ................ B01D 59/44
436/127

FOREIGN PATENT DOCUMENTS

| CN | 1715368 A | 1/2006 |
|----|-----------|--------|
| CN | 102253136 A | 11/2011 |

(Continued)

OTHER PUBLICATIONS

Shasha Chen et al., Elution of Adsorbed n-alkanes by 5Å Molecular Sieve Using Solvent Mixtures for Compound- Specific Hydrogen Isotopic Analysis, Rock and Mineral Analysis, Issue 4, 2017, pp. 413-419.

(Continued)

*Primary Examiner* — John E Breene
*Assistant Examiner* — Alex T Devito

(57) ABSTRACT

A method for analyzing light n-alkane components and carbon isotopes in deep and ultra-deep source rocks includes: (S1) subjecting a 5A molecular sieve column to aging; (S2) pyrolyzing a source rock; and allowing a pyrolysis product to enter the 5A molecular sieve column; where n-alkanes are adsorbed and retained by the 5A molecular sieve column; allowing an outflow to pass through a fractionation plate and an empty column or a weak polarity column to be discharged; and (S3) performing programmed heating such that the n-alkanes adsorbed on the 5A molecular sieve column are successively desorbed according to molecular weight, and then pass through the fractionation plate and the HP-5 or DB-5 column to enter a mass spectrometer for composition analysis or isotopic analysis. An analysis system is further provided.

4 Claims, 3 Drawing Sheets

(51) Int. Cl.
*G01N 30/72* (2006.01)
*G01N 30/80* (2006.01)
*G01N 30/84* (2006.01)
*G01N 30/02* (2006.01)

(52) U.S. Cl.
CPC ....... *G01N 30/84* (2013.01); *G01N 2030/025* (2013.01); *G01N 2030/8405* (2013.01)

(56) References Cited

FOREIGN PATENT DOCUMENTS

| | | |
|---|---|---|
| CN | 102585887 A | 7/2012 |
| CN | 103245735 A | 8/2013 |
| CN | 203616296 U | 5/2014 |
| CN | 104931622 A | 9/2015 |
| CN | 106596745 A | 4/2017 |
| CN | 107045033 A | 8/2017 |
| CN | 107917973 A | 4/2018 |
| CN | 108469490 A | 8/2018 |
| CN | 108680681 A | 10/2018 |
| CN | 109374810 A | 2/2019 |
| CN | 109603413 A | 4/2019 |
| CN | 110187037 A | 8/2019 |
| CN | 111471487 A | 7/2020 |
| CN | 111624273 A | 9/2020 |
| CN | 212674848 U | 3/2021 |

OTHER PUBLICATIONS

Zhaonian Chen, "Petroleum and Natural Gas Geology", Aug. 31, 2005, p. 153.

* cited by examiner

SYSTEM AND METHOD FOR ANALYZING LIGHT N-ALKANE COMPONENTS AND CARBON ISOTOPES IN DEEP AND ULTRA-DEEP SOURCE ROCK

CROSS-REFERENCE TO RELATED APPLICATIONS

This application claims the benefit of priority from Chinese Patent Application No. 202111342945.8, filed on Nov. 12, 2021. The content of the aforementioned application, including any intervening amendments thereto, is incorporated herein by reference in its entirety.

TECHNICAL FIELD

The application relates to chemical analysis techniques, and more particularly to a system and method for analyzing light n-alkane components and carbon isotopes in deep and ultra-deep source rocks.

BACKGROUND

Light hydrocarbon fractions are important components of crude oil and source rocks, and their parameters have been extensively employed as indictors for the source of parent materials, sedimentary environment, type of organic matter, maturity, and oil and gas migration. With regard to the deep and ultra-deep source rocks which have undergone long-term thermal transformation, the general biomarker parameters for identifying the oil-source rock correlation have reached equilibrium, and cannot be used as indicators any more. However, the light hydrocarbon parameters, such as heptane value, paraffin hydrocarbon index, adamantane index and light hydrocarbon isotopic composition, still exhibit good potential as indicators in the geochemical analysis.

In the pyrolysis product of the source rock, $C_1$-$C_7$ components are structurally simple, but the $C_8$ and $C_{8+}$ components have many isomers and a complex structure. There are more isomers for aromatic hydrocarbons. In this case, the chromatographic peaks will partially or completely overlap, as shown in FIG. 1. For a mixture of saturated hydrocarbons, aromatic hydrocarbons and non-hydrocarbon constituents, the co-elution will occur, and two or more peaks overlap. As shown in FIG. 1, the partial overlapping occurs between the chromatographic peak "T" and the peak "1", between the peak "2" and the peak "3", and between the peak "EB" and the peak "4". Although the partial overlapping has little impact on the qualitative analysis of the components, large errors will be brought with respect to the quantitation and carbon isotope analysis of individual components, failing to reveal reliable information.

The existing analytical methods fail to enable the reliable and accurate analysis of $C_8$-$C_{13}$ fractions. In addition, the existing extraction methods fail to effectively extract $C_{13}$ and $C_{13-}$ components from the source rock. Thus, in the field of petroleum geochemistry, few studies have been conducted on these components, especially their isotopes.

Generally, the analysis of alkane components of the source rocks and their carbon isotopes is carried out offline step by step. First, the source rocks are subjected to Soxhlet extraction, and then the extracted components are separated by column chromatography and undergo the 5A molecular sieve adsorption or urea complexation. In the conventional method, light hydrocarbon components ($C_{13-}$) are completely volatilized and lost in the Soxhlet extraction process, and only $C_{13}$ and $C_{13+}$ components and their carbon isotopes can be obtained.

SUMMARY

In view of the deficiencies in the prior art, this application provides a system and method for analyzing light n-alkane components and carbon isotopes in deep and ultra-deep source rocks.

Technical solutions of this application are described as follows.

In a first aspect, this application provides a system for analyzing light n-alkane components and carbon isotopes in deep and ultra-deep source rocks, including:
  a source rock pyrolysis device; and
  a column box equipped with a programmable heating system;
  wherein the column box is provided with a 5A molecular sieve column, a fractionation plate, a first chromatographic column, and a second chromatographic column;
  the pyrolysis device is connected to an inlet of the 5A molecular sieve column, and an outlet of the 5A molecular sieve column is connected with an inlet of the fractionation plate; a first outlet of the fractionation plate is connected with the first chromatographic column through a first pipeline, and a second outlet of the fractionation plate is connected with the second chromatographic column through a second pipeline; and the first outlet of the fractionation plate is provided with a first valve, and the second outlet of the fractionation plate is provided with a second valve;
  the first chromatographic column is an empty column or a weak polarity column;
  the second chromatographic column is HP-5 column or DB-5 column; and
  an outlet of the second chromatographic column is connected to a mass spectrometer.

In an embodiment, the source rock pyrolysis device is a pyrolysis furnace.

In an embodiment, the mass spectrometer is a 7000B triple quadrupole mass spectrometer or a Delta Plus XP isotope ratio mass spectrometer.

In an embodiment, an outlet of the first chromatographic column is connected with a blow-down pipe or a flame ionization detector (FID).

Furthermore, this application provides a method for analyzing light n-alkane components and carbon isotopes in deep and ultra-deep source rocks, including:
  (S1) subjecting a 5A molecular sieve column to aging;
  (S2) subjecting a source rock to pyrolysis to obtain a pyrolysate, and allowing the pyrolysate to pass through the 5A molecular sieve column, wherein n-alkane components in the pyrolysis product are adsorbed by the 5A molecular sieve column and retained in the 5A molecular sieve column; allowing an outflow from the 5A molecular sieve column to pass through a fractionation plate; opening a first valve to allow the outflow to flow through an empty column or a weak polarity column; and continuing to perform helium purging until the source rock is completely pyrolyzed and the pyrolysis product other than the n-alkane components is completely purged; and (S3) turning on a programmable heating system to subject the 5A molecular sieve column and a HP-5 chromatographic column to programmed heating, wherein the n-alkane components adsorbed on the 5A molecular sieve column are successively desorbed according to molecular weight and boiling point; and allowing the n-alkane components to pass through the fractionation plate and the HP-5 chromatographic column for separation, and to enter a mass spectrometer for composition analysis or carbon isotopic analysis.

In an embodiment, in step (S1), the aging is performed with helium as carrier gas to remove volatile organic components adsorbed on the 5A molecular sieve column; and the aging is programmed as follows: 40° C. for 5~10 min; rising to 290~320° C. at 1° C./min; and 290~320° C. for 40~60 min.

In an embodiment, in step (S2), the pyrolysis is performed in a pyrolysis furnace, and is programmed as follows: initial temperature: 40° C.; rising to 290° C. at 20~30° C./min; and 290° C. for 5~10 min.

In an embodiment, in step (S2), after flowing through the empty column or the weak polarity column, the outflow is discharged or detected by an FID detector.

In an embodiment, in step (S3), the programmed heating is performed as follows: 30~35° C. for 5 min; rising to 80° C. at 1~2° C./min; rising to 290° C. at 3~4° C./min; and 290° C. for 25~30 min.

In an embodiment, in step (S3), the mass spectrometer is a 7000B triple quadrupole mass spectrometer or a Delta Plus XP isotope ratio mass spectrometer;

when the pyrolysis in step (S2) is performed in the presence of an internal standard, the n-alkane components are subjected to absolute quantitation by using the 7000B triple quadrupole mass spectrometer; or when the pyrolysis in step (S2) is performed in the absence of the internal standard, the n-alkane components are subjected to relative quantitation by using the 7000B triple quadrupole mass spectrometer to obtain biomarkers of the source rock, or analyzed by the Delta Plus XP isotope ratio mass spectrometer to obtain isotopic values of the n-alkane components.

Compared to the prior art, the present disclosure has the following beneficial effects.

(1) This application improves the analysis accuracy of n-alkane composition and isotope of the source rock. Specifically, the method provided herein can not only obtain the carbon isotope values of the light n-alkanes ($C_{13-}$), but also collect n-alkanes with longer carbon chain (compared with those components extracted by Soxhlet extraction) and isotope values thereof, indicating that the composition analysis is more reliable and accurate. As shown in FIG. 3 and Table 1, $nC_{30}$-$nC_{33}$ component and carbon isotope value thereof are obtained.

(2) This application is applicable to the maturity identification and the oil-source correlation analysis of deep and ultra-deep source rocks. The method has simple operation and high accuracy. The pyrolysate firstly passes through the 5A molecular sieve column to remove most of the isoalkanes, cyclic alkanes, aromatic hydrocarbons, and non-hydrocarbon molecules, and then passes through the HP-5 or DB-5 column for another separation. The chromatogram obtained after two-stage separation is shown in FIG. 3. Compared with FIG. 2, this application almost realizes the complete separation, thereby avoiding the overlapping of peaks. In this way, the co-elution is eliminated, and the obtained isotopic values of the light n-alkanes are more accurate and reliable, such that the biomarker parameters can be accurately calculated, thereby accurately determining the maturity and the oil-source correlation of the source rock.

(3) This application has shortened analysis time and improved analysis rate. In the conventional isotope analysis of n-alkanes, the source rock is firstly subjected to Soxhlet extraction for 72 h; the extract is subjected to asphaltene precipitation, group component separation, molecular sieve complexation and drying (lasting for at least one week); and then the composition and isotopic analysis is carried out. At least one and a half weeks are required to get test results, which is time-consuming and laborious. In this application, a total of 3~5 h is required (10~20 min for the source rock pyrolysis; 20~30 min for adsorption and separation of n-alkanes; 60~90 min for thermal desorption and mass spectrometry analysis; and about 1.5~2.5 h for the composition and isotopic analysis). By comparison, this method is time-saving, highly-efficient and cost-effective.

(4) The method of this application has a wide application range and can be applied to the composition and isotopic analysis of the pyrolysate generated from the pyrolysis of the source rock at 0~1000° C. (the pyrolysate generated below 290° C. corresponds to free hydrocarbons of the source rock (i.e., the extract obtained by the Soxhlet extraction); and the pyrolysate generated above 290° C. corresponds to those hydrocarbons produced by pyrolysis). Therefore, compared to the Soxhlet extraction, this method can obtain more complete and reliable light hydrocarbon composition, and moreover, this method significantly reduces the time consumption and cost compared to the existing isotopic analysis of n-alkanes which requires simulated hydrocarbon generation and collection before isotopic analysis.

DETAILED DESCRIPTION OF EMBODIMENTS

Figure 1:
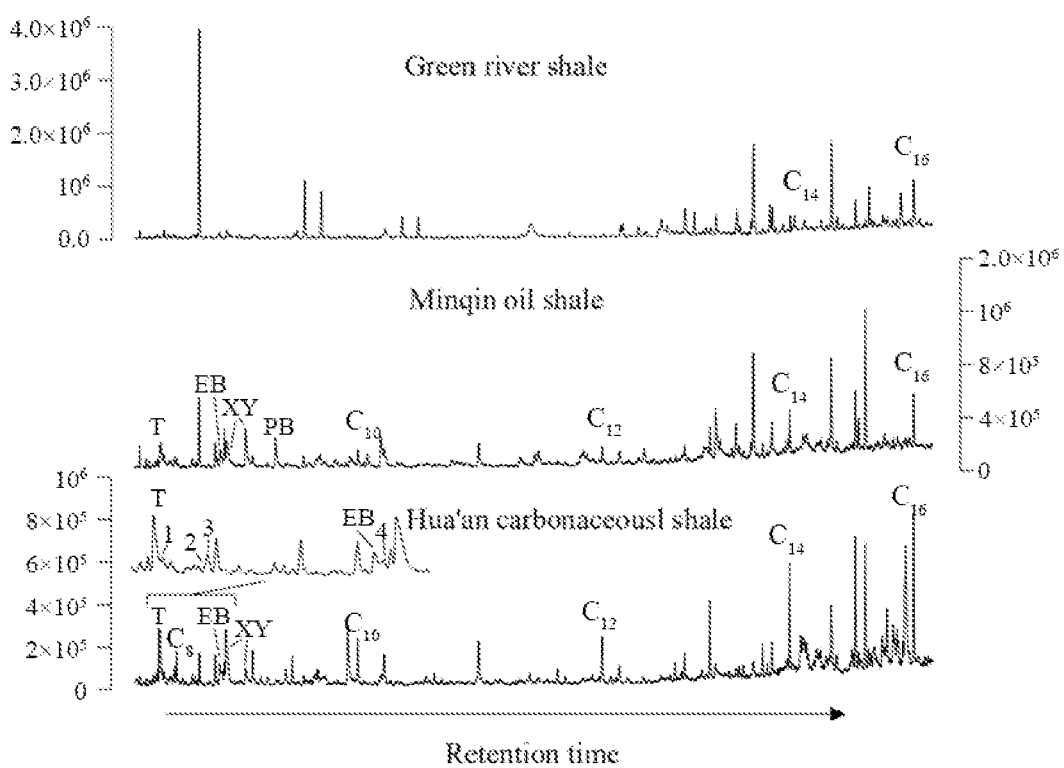
FIG. 1 is a chromatogram showing light hydrocarbon components in pyrolysis products of three kinds of source rocks (Green River shale; Minqin oil shale obtained from Minqin county, China; Hua'an carbonaceous shale obtained from Hua'an county, China) at 290° C.

The disclosure will be described in detail below in conjunction with the embodiments. It should be understood that the following embodiments are merely illustrative, and are not intended to limit the disclosure.

Embodiment 1

Provided herein is a system for analyzing light n-alkane components and carbon isotopes in deep and ultra-deep source rocks, including a source rock pyrolysis device and a column box. The column box is equipped with a programmable heating system, and the source rock pyrolysis device is a pyrolysis furnace.

The column box is provided with a 5A molecular sieve column, a fractionation plate, a first chromatographic column, and a second chromatographic column in the interior. The pyrolysis device is connected to an inlet of the 5A molecular sieve column, and an outlet of the 5A molecular sieve column is connected with an inlet of the fractionation plate. A first outlet of the fractionation plate is connected with the first chromatographic column through a first pipeline, and a second outlet of the fractionation plate is connected with the second chromatographic column through a second pipeline. The first outlet of the fractionation plate is provided with a first valve, and the second outlet of the fractionation plate is provided with a second valve. The first chromatographic column is an empty column or a weak polarity column. In an embodiment, an outlet of the first chromatographic column is connected with a blow-down pipe or a flame ionization detector (FID). The second chromatographic column is HP-5 column. An outlet of the HP-5 column is connected to a mass spectrometer. The mass spectrometer is a 7000B triple quadrupole mass spectrometer or a Delta Plus XP isotope ratio mass spectrometer.

If only the n-alkanes are analyzed, the first chromatographic column is the empty column. An outflow from the 5A molecular sieve column is directly discharged from the column box through the empty column. According to the need, the outflow from the 5A molecular sieve column can also be separated using the weak polarity column, and then aromatic and non-hydrocarbon components can be detected by FID. The obtained test results can also be used to evaluate source rocks and compare oil sources.

Embodiment 2

Provided herein was a method for analyzing light n-alkane components and carbon isotopes in deep and ultra-deep source rocks.

(S1) The 5A molecular sieve column was aged. The aging was programmed as follows: 40° C. for 10 min; rising to 290° C. at 1° C./min; and 290° C. for 60 min. The aging was performed with helium as carrier gas to remove volatile organic components adsorbed on the 5A molecular sieve column, thereby ensuring complete pyrolysis of the residual components in the 5A molecular sieve column.

(S2) 1~5 mg of the source rocks were added to the pyrolysis furnace for pyrolysis to obtain a pyrolysate. The pyrolysis was performed in a pyrolysis furnace, and was programmed as follows: initial temperature: 40° C.; rising to 290° C. at 30° C./min; and 290° C. for 5 min. The pyrolysate passed through the 5A molecular sieve column. N-alkanes in the pyrolysis product were adsorbed by the 5A molecular sieve column and retained therein. An outflow from the 5A molecular sieve column passed through the fractionation plate. The first valve of the fractionation plate was opened, and the second valve of the fractionation plate was closed, thereby allowing the outflow to flow through the first column to discharge or detect by FID. The first column was the empty column or the weak polarity column. Helium was continued to purge until the source rock was completely pyrolyzed and kept for 30 min, thereby ensuring that pyrolysis product such as isomeric alkanes, aromatic hydrocarbons and non-hydrocarbon components on the surface of the 5A molecular sieve column were completely purged.

Figure 2:
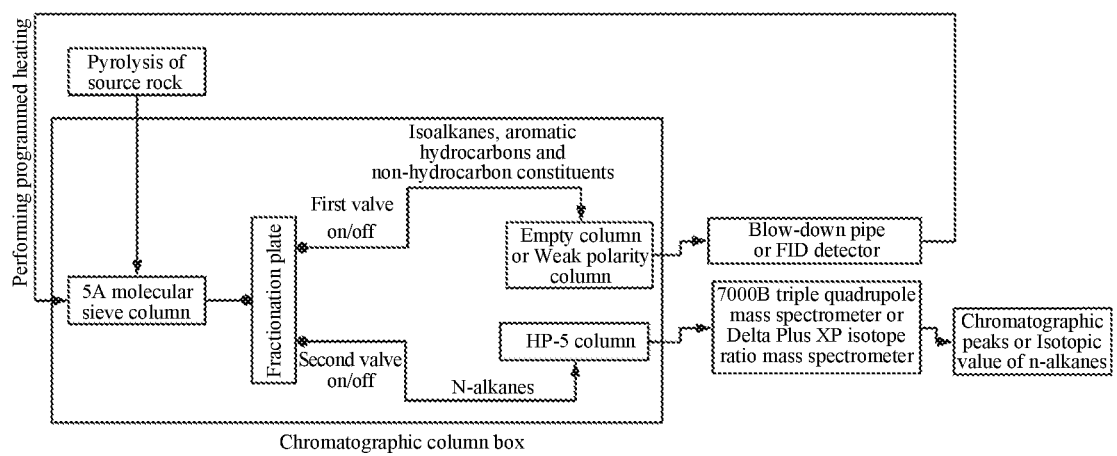
FIG. 2 is a flow chart of light n-alkane composition and isotopic analysis of the source rock.

(S3) The first valve of the fractionation plate was closed, the second valve of the fractionation plate was opened, and then the programmable heating system was turned on and the column box with the 5A molecular sieve column and the second column was heated. The programmed heating was performed as follows: 30° C. for 5 min; rising to 80° C. at 2° C./min; rising to 290° C. at 3° C./min; and 290° C. for 25~30 min. The n-alkanes adsorbed on the 5A molecular sieve column were successively desorbed according to molecular weight and boiling points thereof, then passed through the fractionation plate and HP-5 chromatographic column for separation, as shown in FIG. 2. The first and second chromatographic columns used were Agilent HP-PLOT 5A molecular sieve gas column (30 m×0.53 mm×50 um) and Agilent HP-5 conventional gas column (30 m×0.32 mm×0.25 um). The programmable heating system was an oven.

Embodiment 3

Figure 3:
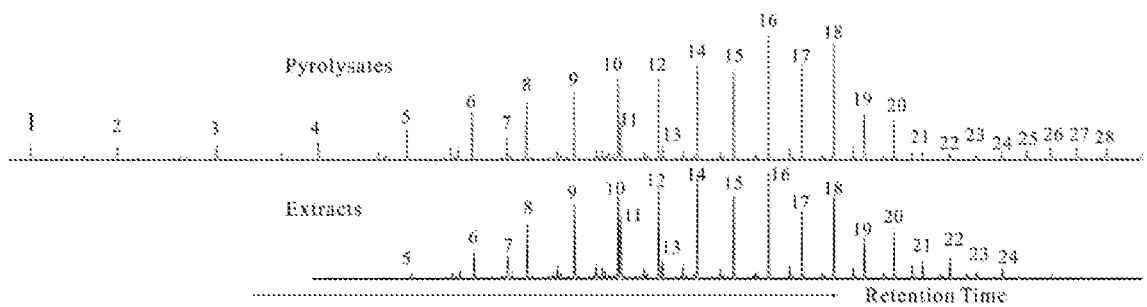
FIG. 3 shows MS comparison of pyrolysates of Hua'an carbonaceous shale obtained by two different strategies, where the upper mass spectrum reveals the composition of a pyrolysate produced by thermal desorption and on-line separation and purification by a 5A molecular sieve gas chromatography column; and the lower mass spectrum reveals the composition of a pyrolysate produced by Soxhlet extraction and offline separation and purification by the 5A molecular sieve packed column.

In this embodiment, three kinds of source rocks (Green River shale, Minqin oil shale, and Hua'an carbonaceous shale) were used. The desorption temperature was set to 290° C., and the optimal temperature for pyrolysis of the source rock was 290° C. At this temperature, the adsorbed hydrocarbons can be completely desorbed, and will not undergo pyrolysis. The analysis experiments were carried out using the method in Embodiment 2, and the analysis results were compared with those of the extract obtained by Soxhlet extraction (as shown in FIG. 3).

In this embodiment, low-temperature pyrolysis and 5A molecular sieve column on-line purification analysis technology were used, not only the $C_9$~$C_{16}$ saturated hydrocarbon light component and its carbon isotopic values were extracted, but also the alkane component with high molecular weight and its carbon isotopic values in $C_{17}$~$C_{33}$ were obtained. The alkane carbon isotope values obtained by the method of this application were close to Soxhlet extraction, as shown in Table 1. The experimental error was less than 5% % within the experimental error range.

TABLE 1

Comparison of alkane carbon isotope values of Hua'an carbonaceous shale obtained by two methods

| | Isotope value ($\delta^{13}C$) | | | | Isotope value ($\delta^{13}C$) | |
| --- | --- | --- | --- | --- | --- | --- |
| No. Component | Soxhlet extraction-offline separation and purification using a 5A molecular sieve packed column | Thermal desorption-online separation and purification using a 5A molecular sieve GC column | No. Component | | Soxhlet extraction | Thermal analysis |
| 1 n-Nonane (n-$C_9H_{20}$) | — | −32.2 | 15 n-Eicosane (n-$C_{20}H_{42}$) | | −34.3 | −34.7 |
| 2 n-Decane (n-$C_{10}H_{22}$) | — | −33.3 | 16 n-Heneicosane (n-$C_{21}H_{44}$) | | −35.8 | −35.5 |
| 3 n-Undecane (n-$C_{11}H_{24}$) | — | −31.6 | 17 n-Docosane (n-$C_{22}H_{46}$) | | −34.5 | −34.7 |
| 4 n-Dodecane (n-$C_{12}H_{26}$) | — | −32.3 | 18 n-Tricosane (n-$C_{23}H_{48}$) | | −34.9 | −35.0 |
| 5 n-Tridecane (n-$C_{13}H_{28}$) | −33.3 | −33.5 | 19 n-Tetracosane (n-$C_{24}H_{50}$) | | −35.2 | −35.0 |
| 6 n-Tetradecane (n-$C_{14}H_{30}$) | −34.8 | −34.7 | 20 n-Pentaccosane (n-$C_{25}H_{52}$) | | −33.7 | −34.1 |
| 7 nor-Pristane (i-$C_{14}H_{30}$) | −37.5 | −37.9 | 21 n-Hexacosane (n-$C_{26}H_{54}$) | | −33.6 | −34.3 |
| 8 n-Pentadecane (n-$C_{15}H_{32}$) | −33.7 | −33.9 | 22 n-Heptacosane (n-$C_{27}H_{56}$) | | −33.1 | −33.9 |
| 9 n-Hexadecane (n-$C_{16}H_{34}$) | −33.5 | −34.0 | 23 n-Octacosane (n-$C_{28}H_{58}$) | | −33.5 | −33.3 |
| 10 n-Heptadecane (n-$C_{17}H_{36}$) | −33.6 | −33.7 | 24 n-Nonacosane (n-$C_{29}H_{60}$) | | −35.7 | −35.2 |
| 11 Pristane (i-$C_{19}H_{40}$) | −37.9 | −37.6 | 25 n-Triacontane (n-$C_{30}H_{62}$) | | — | −35.8 |
| 12 n-Octadecane (n-$C_{18}H_{38}$) | −32.3 | −32.4 | 26 n-Hentriacontane (n-$C_{31}H_{64}$) | | — | −36.4 |
| 13 Phytane (i-$C_{20}H_{42}$) | −39.5 | −39.2 | 27 n-Dotriacontane (n-$C_{32}H_{66}$) | | — | −36.2 |
| 14 n-Nonadecane (n-$C_{19}H_{40}$) | −34.9 | −34.7 | 28 n-Tritriacontane (n-$C_{33}H_{68}$) | | — | −34.6 |

Note:
"—" indicates "not detected".

DESCRIPTION

In addition, this application not only obtains light hydrocarbon biomarkers, but also obtains a complete range of large molecular weight n-alkane biomarker compounds that are consistent with the composition of the Soxhlet extract. The distribution characteristics of the Pristane and Phytane are very similar, as shown in Table 2. Table 2 shows that the low-temperature pyrolysis products of the source rocks and the corresponding extraction products are basically consistent in the parameters related to the sedimentary environment of the source rocks, such as pristane-phytane ratio (Pr/Ph), the pristane/n-$C_{17}$ (Pr/n-$C_{17}$), and the phytosane/n-$C_{18}$ (Ph/n-$C_{18}$). Therefore, the above results indicate that the low-temperature pyrolysis and 5A molecular sieve column on-line purification analysis technology is an effective method for quantify light hydrocarbon components and their monomer carbon isotope analysis in source rocks.

TABLE 2

Comparison of biomarker parameters obtained by two methods

| Sample | Method (A: thermal desorption-online separation and purification using 5A molecular sieve gas chromatography column; B: Soxhlet extraction-offline separation and purification using a 5A molecular sieve packed column | Pr/Ph | Pr/$C_{17}$ | Ph/$C_{18}$ |
| --- | --- | --- | --- | --- |
| Green River shale | A | 0.45 | 0.74 | 8.19 |
| | B | 0.45 | 0.70 | 8.39 |
| Minqin oil shale | A | 1.06 | 1.62 | 1.90 |
| | B | 0.90 | 1.68 | 2.26 |
| Hua'an carbonaceous shale | A | 3.00 | 0.50 | 0.15 |
| | B | 3.36 | 0.75 | 0.19 |

In Table 1, the mass spectrometer was Finnigan Delta Plus XP isotope ratio mass spectrometer, and temperature in the oxidation furnace was 930° C.

In Table 2, the mass spectrometry detector was Agilent 7000B triple quadrupole mass spectrometer. The mass spectrometry ion source was EI, the ion source temperature was 230° C., the ion source ionization energy was 70 eV, and the interface temperature was 280° C. The acquisition method is full scanning, and the mass range is 10~550 amu.

In this embodiment, in the absence of an internal standard, Table 1 revealed isotope values of individual components, and Table 2 showed relative quantitation results of the components. If internal standards were added during pyrolysis of source rocks, the mass spectrometry detector can also be used to quantify the absolute values of each component.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A system for analyzing light n-alkane components and carbon isotopes in deep and ultra-deep source rocks, comprising:
    a source rock pyrolysis device; and
    a column box equipped with a programmable heating system;
    wherein the column box is provided with a 5A molecular sieve column, a dividing plate, a first chromatographic column, and a second chromatographic column;
    the pyrolysis device is connected to an inlet of the 5A molecular sieve column, and an outlet of the 5A molecular sieve column is connected with an inlet of the dividing plate; a first outlet of the dividing plate is connected with the first chromatographic column through a first pipeline, and a second outlet of the dividing plate is connected with the second chromatographic column through a second pipeline; and the first outlet of the dividing plate is provided with a first valve, and the second outlet of the dividing plate is provided with a second valve;
    the first chromatographic column is an empty column or a weak polarity column;
    and
    an outlet of the second chromatographic column is connected to a mass spectrometer.

2. The system of claim 1, wherein the source rock pyrolysis device is a pyrolysis furnace.

3. The system of claim 1, wherein the mass spectrometer is a triple quadrupole mass spectrometer or an isotope ratio mass spectrometer.

4. The system of claim 1, wherein an outlet of the first chromatographic column is connected with a blow-down pipe or a flame ionization detector (FID).

* * * * *